Feb. 13, 1940.　　　W. G. SIMMONS　　　2,189,866
SCALE
Filed Oct. 26, 1938　　　2 Sheets-Sheet 1
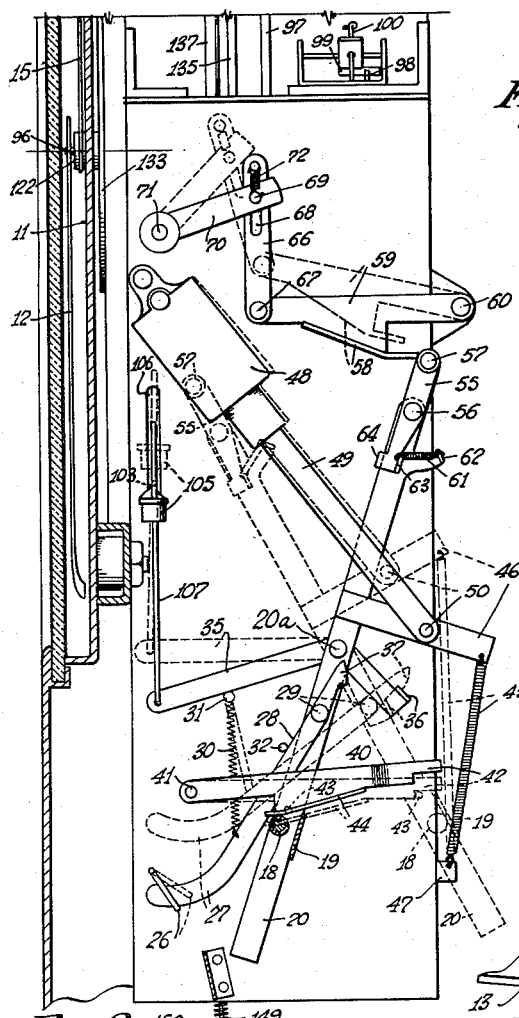
William G. Simmons
INVENTOR.
BY Clarence E. Threedy
HIS ATTORNEY.

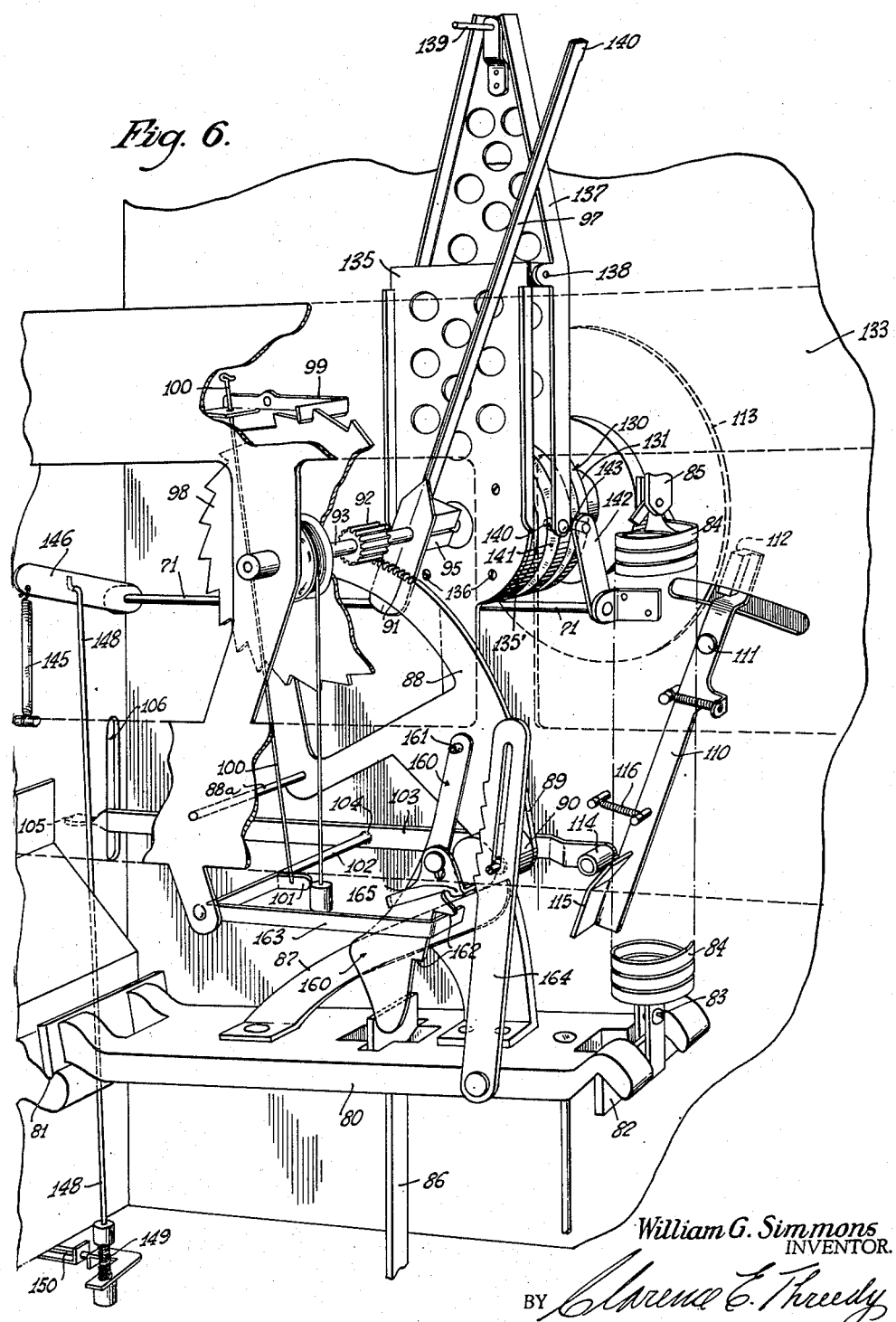

Patented Feb. 13, 1940

2,189,866

UNITED STATES PATENT OFFICE 2,189,866

SCALE

William G. Simmons, Chicago, Ill.

Application October 26, 1938, Serial No. 237,083

3 Claims. (Cl. 194—1)

This invention relates to coin-operated weighing machinery and has as one of its principal objects the provision of a preselecting mechanism in a coin-operated scale and so arranged that the patron's coin will be returned if the weight as actually indicated by the weighing mechanism coincides with that of the preselecting indicator.

Other objects include the provision of various coacting mechanisms for accomplishing the foregoing principal object.

Viewed from another aspect, it is an object of the invention to arrange a coin-freed weighing mechanism for coaction with a preselecting mechanism and a coin control so that the coincidence of the indicated weight with the preselectively designated weight will effect a return of the coin, whereas the coin will be collected in the event of failure of such coincidence.

Other advantages, economies, and novel aspects of the invention will be apparent from the following description considered in view of the annexed drawings, in which:

Fig. 1 is a fragmentary front perspective of a scale and control means thereon;

Fig. 2 is a vertical section along line 2—2 of Fig. 1, and shows the master operating lever means;

Fig. 3 is a vertical section of the preselecting and weighing scale pointer structure, to enlarged scale, as seen from line 3—3 of Fig. 1;

Fig. 4 is a sectional detail of the manual slip clutch control for the selecting pointer, as seen from line 4—4 in Fig. 1;

Fig. 5 is a rear perspective of the coin discharging means; while

Fig. 6 is a rear perspective of the weighing and selecting mechanism.

Referring to Fig. 1, a preferred embodiment of the invention includes an upright housing 10 having a window in its upper portion and behind which is a calibrated weight indicating scale 11 before which turns a weighing pointer 12, operated by weighing mechanism disposed within the standard or housing, and which mechanism is freed for operation by a coin-operated control slide 13.

Arranged on the front panel of the standard is a dial knob 14 having driving connection with a selecting pointer 15 mounted to turn concentrically with the weighing pointer upon manipulation of the knob 14, the object of the latter arrangement being to permit the patron to set the pointer 15 to indicate his expected weight, prior to operation of the coin control, so that when the weighing mechanism subsequently operates to cause the main pointer to indicate the actual weight, the coin will be returned in a cup 15 if the two pointers coincide or designate substantially the same weight.

Thus, if a person's weight remains unchanged from one time to another, the coin will not be collected, but, on the other hand, if the scale indicates a new and different weight and in this respect indicates to the patron a change in his condition, the coin will be collected.

The coin slide 13 may be of the familiar construction wherein a coin is deposited in an opening in the slide and the member 13 moved inwardly a predetermined amount provided the coin is acceptable, and the coin thereafter being discharged from the slide for movement into some form of collecting receptacle. In the present arrangement, the coin is held in a position for selective disposition prior to its ultimate disposition, since the coin may be returned or collected.

Operating mechanism for the device is actuated by the inner end of the slide 13 from which depends (Fig. 5) a roller 18. When the slide is moved inwardly, the roller 18 bears against an offset flange 19 on a main operating lever 20 which is pivoted as at 20a for movement in the direction of reciprocation of the slide 13. When the slide is moved its full amount inwardly, the operating lever 20 will be pivoted into the dotted line position shown in Fig. 2, at which time the coin will be freed from the slide and fall into the mouth of a selecting chute 21 (Fig. 5) on a side of which is pivoted as at 22 a stopping arm 23 having its nose portion 24 projected through a slot in the side of the chute or receptacle so as to block any coin element against movement toward the lower portion thereof, a spring 25 coacting with the stop lever 23 to project its nose portion constantly toward blocking position.

The blocking lever 23 has an offset crank arm 26 (Figs. 2 and 5) which is disposed for engagement by the curved edge portion 27 of a pawl 28 pivoted on the main operating lever as at 29 and normally urged in an upward direction by the action of a spring 30 attached thereto and anchored as at 31 on the mounting plate for the main lever. When the main operating lever 20 is moved into dotted line position as aforesaid, the pawl 28 is drawn upwardly by its spring due to movement by the pawl away from a stopping pin 32 on the mounting plate so that the curved or cam edge portion 27 of the pawl is withdrawn from the crank extension 26 of the coin blocking arm and the nose of the latter will be projected by its spring to block the coin receptacle.

Pivoted coaxially with the main operating lever 20 as at 20a is a selector operating lever 35 having an offset lug 36 at one end which is engaged by a hooked end portion 37 on the pawl when the main lever 20 is moved toward dotted line position so that the selecting arm 35 is, in a manner of speaking, coupled with the main operating lever upon initial movement of the latter, the lever 35 normally being restrained from upward (clockwise movement) during such initial movement due to its operative connection with other parts described hereinafter.

Means for assuring the full stroke movement of the main operating lever includes the provision of a locking pawl 40 pivotally mounted on the mounting plate as at 41 and having a notched nose portion 42 at its opposite end which drops into engagement with a pin 43 on the main operating lever when the latter is moved initially into dotted line position, there being a cam flange 44 on the locking lever or pawl disposed for engagement by the roller 18 on the coin slide so that when the latter is restored by the patron to its normal position (toward the left in Figs. 2 and 5), the pawl 40 will be pivoted upwardly to withdraw the end portion 42 from the stopping pin 43 to permit the main operating lever 20 to pivot back toward its initial position under the urgence of an operating spring 45 attached to a laterally projecting arm on the main lever, and to a lug 47 on the mounting plate.

Means for regulating the rate of return of the main operating lever includes the provision of a time-delay or dashpot device 48 having a plunger operating arm 49 pivotally connected as at 50 to the laterally projecting arm 46 on the main operating lever. Thus, when the main operating lever is initially moved toward dotted line position, as seen in Fig. 2, the dashpot or time-delay device 48 is set against the tension of the spring 45 and the lever is locked in this initial or set position due to the operation of the locking pawl 40, the latter being released when the coin slide is retracted, and the spring 45 urging the main lever back to its initial position, the rate of such movement being regulated by the dashpot 48.

Attention may be called at this juncture to the fact that when the main operating lever is restored as aforesaid to its initial position, the pawl 28 will be unhooked from its engagement with the lever 35 and will be pivoted downwardly so that its cam edge 27 bears against the crank arm 26 on the coin blocking lever to move the latter into ineffective position and release the held coin for purposes hereinafter to appear.

It may be assumed that the patron has previously selected his expected weight by manipulation of the knob 14 and that he has thereafter deposited his coin in the slide and operated the latter to set the main operating levers into motion, as heretofore described. When the main operating lever 20 is moved toward the left into initial dotted line position, a uni-directional dog 55 pivoted as at 56 on an upper end thereof is permitted to yield so that the roller 57 thereon may pass beneath an angled flange 58 on a lever arm 59 pivoted as at 60 on the mounting plate, this action being effected through the provision of a spring 61 attached as at 62 to the main operating lever and as at 63 to a lug on the unidirectional dog, the latter having another offset lug 64 which bears against an edge of the main operating lever to prevent the dog from pivoting relative to the lever when the latter moves back toward its normal position, the spring 61, however, permitting the dog to yield so that its roller will pass beneath the angled flange 58 when the operating lever initially moves toward the left.

Upon return movement of the main operating lever, the dog 55 is held rigid with the latter so that its roller 57 bears against the angled flange 58 and moves the lever 59 upwardly.

This actuates the preselecting mechanism for cooperation with the weighing mechanism, through the agency of a link 66 which is pivoted as at 67 on the lever 59 and is moved upwardly with the latter to cause a spring 72 thereon and attached to a pin 69 on arm 70 and projecting into a slot 68 in the link 66 to lift the lever 70 which is rigid on a shaft 71. Thus, the members 55, 59, 66, 72 provide a yieldable connection between the main operating lever 20 and the operating arm 70 for shaft 71. Shaft 71 extends through the mounting plate (see Fig. 6) into the compartment occupied by the weighing mechanism.

Thus, return movement of the main operating lever 20 effects a rocking of the lever arm 70 toward the dotted line position indicated in Fig. 2 for the purpose of rocking the shaft 71, provided the latter is free to move, and thereby operating a coin deflecting gate in the coin receptacle 21, as will be pointed out hereinafter.

The weighing mechanism is released for operation by upward movement of the lever 35 on main operating lever 20. As seen in Fig. 6, the weighing mechanism includes a beam 80 fulcrumed on knife edge mountings 81 and 82 at its opposite ends, the mounting 81 being stationary, and the knife edge mounting 82 being attached as at 83 to the lower end of a scale spring 84, the upper end of the latter being fixedly mounted as at 85. The beam is operatively connected with the weighing platform by a depending rod 86 so that when the patron steps on the scale the beam 80 will move downwardly against the tension of the spring 84, such downward movement of the beam lowering the cam arm 87 secured thereto, various amounts depending upon the weight of the person on the platform, and it may be remarked that this movement of the beam occurs independently of any deposit of a coin in the machine.

Indication of the weight is effected through the agency of a segmental gear 88 pivotally mounted on a shaft 88a and having an arm 89 which has a roller 90 positioned for engagement with the curved or angled cam edge of the member 87 when the latter is in various positions. Gear teeth 91 on the segment are engaged with a pinion 92 on a main pointer shaft 93 which extends coaxially with the axis of the scale pointer 12, the latter being connected with the main shaft, as shown in Fig. 3, through the agency of a coupling block 95 in which one end of the shaft 93 terminates and in which the inner free end of the scale pointer shaft 96 likewise terminates for coupling with the main shaft due to clamping engagement thereby of the coupling block 95. A selecting pointer arm or stopping index 97 is secured to the coupling block 95 for movement with the main shaft responsive to movements of the segment 88.

The segment 88 is normally restrained from moving downwardly (clockwise, Fig. 6) through the agency of a ratchet wheel 98 rotatable with the shaft 93 and normally locked against movement by engagement of a pawl 99 with the teeth thereof. Thus, while the beam 80 may be moved downwardly by someone standing on the scale, there will be no indication of the weight since the segment 88 and hence its roller 80 are prevented from moving by the ratchet wheel 98.

The pawl 99 is released by downward movement of a rod 100 attached thereto at its upper end and connected at its lower end with a lug 101 on an arm 102 which in turn is rigid with a transverse operating arm 103 pivoted as at 104. When the arm 103 is moved downwardly, the rod 100 will be moved downwardly also and pawl 99 withdrawn from the ratchet, whereupon the segment 88 may pivot downwardly to any position permitted by engagement of its roller 90 with the cam arm 87 on the beam.

The transverse arm 103 has a twisted free-end portion 105 which projects through a slot 106 on the opposite side of the mounting plate upon which the main operating lever 20 is mounted, this free-end portion 105 being seen in Fig. 2 where it is connected by a rod 107 with the lever 35. When the main operating lever 20 returns from dotted line position, the arm 35 is raised to dotted line position and pushes the rod 107 to raise the end 105, and hence the roller 114 of the transverse operating arm 103 is moved downwardly and arm 103 releases the ratchet pawl 99 so that the scale pointer shaft is free to turn, the selecting pointer 97 moving to the corresponding position behind the calibrated scale panel, and the pointer 12 indicating the weight to the patron on the front side of the scale panel.

The transverse operating arm 103 coacts with means for preventing the adjustment of the selecting pointer after the coin has been deposited, so that the machine cannot be defrauded, this latter means including a brake lever 110 pivoted within the housing as at 111 so as to project a friction brake portion 112 against the periphery of a brake disc 113 which is rigid with the hub structure of the selecting pointer, such movement being effected by a roller 114 on the end of the transverse lever opposite its free end and which bears against a flange 115 on the brake lever and moves the latter against the tension of its normal spring 116 into braking contact with the disc. It may be remarked that the brake will be held in effective position during the entire restorative movement of the main operating lever 20 so long as there is a weight on the scale platform, this being accomplished by a locking dog 160 pivoted as at 161 on the rear wall shown in dotted line, and having teeth 162 which hold an offset arm 163, rigid with shaft 102 and transverse operating arm 103, down to urge the brake against disc 113 so long as the beam is down. When the beam rises to normal position, the teeth of a pivoted rack bar 164 catch a dog 165 mounted on the locking dog 160 so as to raise the latter and permit arms 163 and 103 to return to normal.

The hub structure is shown in Fig. 3 and includes a pulley 120 from which projects a sleeve 121 coaxially with the main scale pointer shaft 93, the pulley being journaled in suitable mounting means behind the dial panel 11. The selecting pointer 15 is secured to the hub of the pulley by a threaded plug 122, and the scale pointer 12 is secured to the end of the secondary or small pointer shaft 96, which in turn extends through the plug 122 and the sleeve portion of the pulley for engagement with the coupling block 95 connecting it with the main pointer shaft 93. In this manner, the selecting and weight indicating pointers are mounted concentrically, and since the brake disc 113 is also rigid with the pulley 120 it will be apparent that when the brake arm 110 is in effective position it will be impossible to rotate the selecting pointer 15.

Referring to Fig. 4, the manual selecting knob 14 is impositively connected to the selecting pointer by means of a slip pulley 125 arranged to rotate with the shaft 126 of the knob through frictional engagement of a spring 127 expanding between the shaft and the small pulley wheel. If the main pulley 120 is held against movement by the brake means, the smaller pulley 125 will slip when an attempt is made to turn the knob 14. Thus, the patron is prevented from moving the preselecting pointer into a position to correspond with the weighing pointer after the latter has started its movement.

The selecting means includes a stopping device comprising a circumferentially channeled collar 130 (Figs. 3 and 6) arranged to float and also to slide axially on a sleeve 131 telescoped onto the sleeve shaft 121 of the main pulley and held against movement by a connection 132 with a wall portion 133 of the scale mounting structure. A vertical mounting plate 135 is secured as at 136 to the collar 135' fixed to sleeve 121 and rotates with the latter about the pointer axis. A pan 137 is pivotally mounted as at 138 on the plate 135 and moves with the latter about the pointer shafts and is also disposed for pivotal movement in the direction of the long axis of the pointer shaft so as to project a stopping pin 139 on the upper end thereof into position for engagement with the upper end portion 140 of the preselecting pointer 97 should the latter come to rest opposite a position at which the stop pin had been positioned as a result of manipulating the knob 14.

The pivoted pan 137 is normally disposed in a position to withdraw the stopping pin 139 from the plane of movement of the selecting pointer 97 and this is effected through the disposition of pins 140 into one of the circumferential channels or tracks 141 in the channeled collar 130. Thus the collar is free to rotate without effecting movement of the pan; however when the collar is slid axially along the sleeve member 131 the pan will be pivoted to project the pin 139 toward and away from the plane of movement of the selecting pointer 97 and particularly the upper end 140 thereof.

Such movement of the pan is effected through the connection of a pair of levers 142 with the channeled collar by means of pins 143 which project into another of the circumferential channel tracks on the collar 130. The levers 142 are rigid on the shaft 71 and it will be recalled that the latter is rocked (anticlockwise in Fig. 2, clockwise in Fig. 6, that is, upwardly) when the main operating lever 20 moves back toward normal position, the unidirectional dog 55 transiently engaging the cam flange 58 so that the shaft 71 may be rocked by a spring 145 (Fig. 6) back to its normal position when the operating lever finally reaches its normal position, the spring 145 being attached at one end to the mounting plate and at its opposite end to a lever 146 rigid with the shaft 71. By this arrangement, the pan 137 will be moved to project its pin 139 into the path of movement of the main preselecting pointer 97 once for each complete operation of the main operating lever 20.

Final disposition of the coin which is retained in the upper portion of the receptacle 21 during various movements of the foregoing mechanism, is effected through the agency of a depending connecting rod 148 (Figs. 5 and 6) attached at its upper end to the lever arm 146 on shaft 71, and at its lower end by means of yieldable connecting means 149 to the shaft 150 of a flag or gate 151 disposed in the coin receptacle 21 in the region beneath the blocking nose 24. The gate 151 is normally disposed in the position seen in Fig. 5, so as to direct a coin over an angled deflector 153 and into the return receptacle 16. When the flag is pivoted into the dotted line position shown in Fig. 5, the coin is deflected down the opposite side of the member 153 (toward the right) and into a suitable coin collecting receptacle.

Briefly summarizing the operation of the various mechanisms heretofore described, it is assumed that a patron has set the pointer 15 at a certain weight by turning the knob 14 while he is on or off the scale platform, and thereafter that he has deposited a coin in the chute and pushed the slide 13 inwardly. Manipulation of the knob 14 will cause the pan 137 to be moved to a position corresponding to the preselected weight, the pan at this time, however, being pivoted to withdraw its stopping pin 139 from any possible engagement with the main preselecting pointer 97.

During restorative movement of the main operating lever, the lever arms actuated by the unidirectional dog will make an effort to rock the lever 70 and hence the shaft 71, such rocking movement of the shaft 71 being prevented, however, if the pin 139 has been so positioned that the selecting pointer 97 stops opposite the pin (this condition constituting coincidence of the preselecting and weight indicating pointers), the pivotal movement of the pan 137 by the lever arm 142, which also turns with the shaft 71, being prevented so that the effort of the unidirectional dog and lever mechanism to rock the shaft 71 is likewise prevented, and as a consequence upward movement of the connecting rod 148 is also prevented and the gate 151 remains in position to deflect the coin back to the return receptacle when the blocking arm 23—24 releases the coin.

In the event that the patron has failed to set the pointer 15 at a position which will cause the stop pin 139 on the pan to coincide with the position of the main preselecting pointer 97, the shaft 71 will be free to rock completely and hence the rod 148 will be lifted and the gate 151 pivoted into dotted line position to deflect the coin into the collecting receptable.

The objects and advantages of the invention may be realized by other forms of construction and modes of operation of the arrangement specifically set forth herein for purposes of illustration, and it is a condition of this disclosure that the appended claims are to include all equivalent arrangements fairly coming within their call.

Having thus described my invention, what I claim as new and desire to protect by Letters Patent is:

1. In a coin controlled weight indicating scale including weighing mechanism, means operable to preselectively designate a particular weight which the scale is expected to indicate when a coin is deposited to actuate the same, coin guiding means movable from a normal position to direct a coin into a collection receptacle and arranged to direct a coin into a coin return receptacle when in said normal position, means arranged to move said guiding means out of normal position once during each operation of the scale as aforesaid, and coacting stop means operatively positioned respectively by said preselective designating means and said weighing mechanism of said scale for stopping engagement to prevent movement of said guiding means from normal position as aforesaid provided the weight preselectively designated coincides substantially with that actually indicated by said scale, and means for preventing adjusting movement of said stop means by said preselectively operable means while said scale is partly or wholly in weight indicating operation.

2. In a coin-controlled scale, in combination, a coin-freed control for setting the scale in operation, coin return mechanism including a movable coin guide normally positioned to direct a coin into a return receptacle and movable out of normal position to direct a coin into a collection receptacle, means actuated by said control responsive to each coin-freed operation of the same for moving said guide out of normal position to effect collection of a coin, and an adjustable stopping device including a movable stop element and mechanism cooperating therewith to prevent movement of said guide out of normal position when said movable stop element is restrained against movement, and a scale-operated stopping index with respect to which said stopping device is selectively adjusted to position said movable stop element in alignment with said index whereby movement of the stop element may be prevented by engagement with the index.

3. In a weighing machine, weight indicating means including a rotatable blocking arm, weight estimating means including a rockably mounted member arranged to be selectively adjusted into a position in which it will be in alignment with said arm when the indicated and estimated weights are the same, coin guiding means for collecting or returning a coin and including a pivotally mounted butterfly valve normally in position to eject returned coins from said machine, means for moving said butterfly valve from said normal position into position to direct coins into a collection receptacle in said machine, and means coacting with said rockably mounted member when said member is aligned with said arm to prevent movement of said butterfly valve out of normal position into coin collecting position whenever the indicated and estimated weights are the same and the blocking arm and rockable member are aligned as aforesaid.

WILLIAM G. SIMMONS.